Patented Jan. 17, 1933

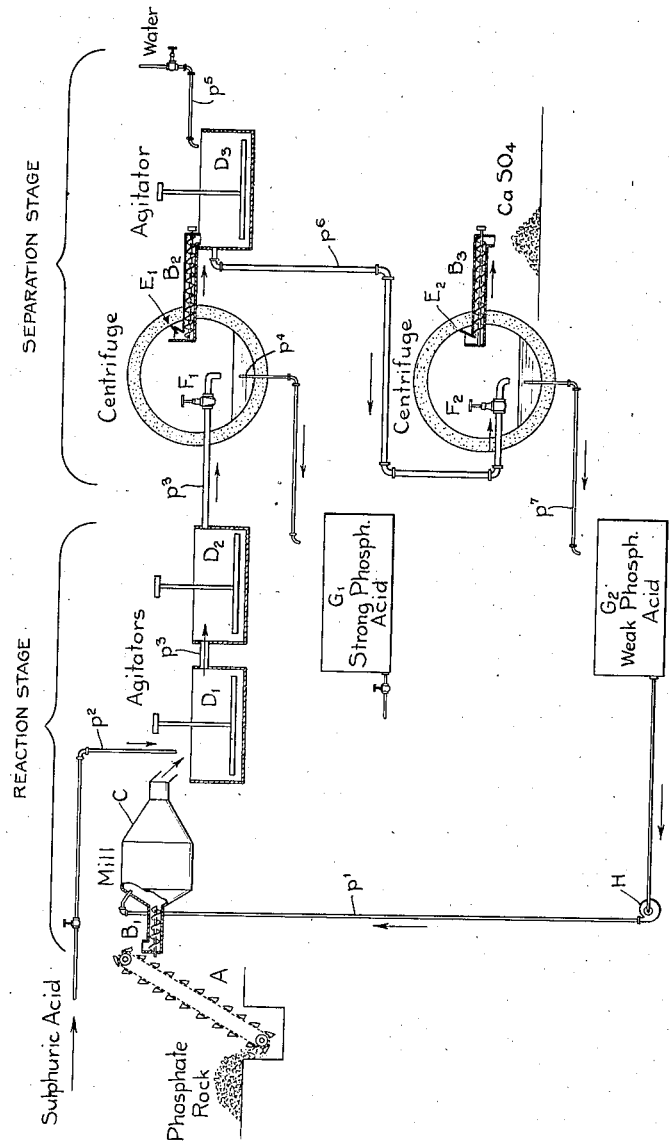

1,894,514

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

PHOSPHORIC ACID MANUFACTURE

Application filed October 4, 1929. Serial No. 397,192.

This invention relates to phosphoric acid manufacture and has special reference to the provision of an improved method of manufacturing phosphoric acid from phosphate rock and sulphuric acid.

One of the known methods practiced for manufacturing phosphoric acid consists in reducing phosphate rock which is mainly tricalcium phosphate by the action of sulphuric acid to calcium sulphate and phosphoric acid. In carrying out this method, phosphate rock in ground or comminuted form is thoroughly reacted with sulphuric acid, resulting in a mixture or slurry of calcium sulphate in phosphoric acid, from which slurry the phosphoric acid is then separated from the calcium sulphate.

In prior methods great difficulty has been experienced in thoroughly or properly separating the calcium sulphate and the phosphoric acid, separation being objectionably attended with too great a dilution of the acid, the use of an excessive amount of power and the necessity of supplying expensive and cumbersome plant equipment which occupies large plant space and which requires expensive operating methods. In accordance with one known separation method, the slurry is run through a series of Dorr separators arranged and operating in cascade, each separator comprising a large tank in which the mixture is subjected to treatment for separating the solid or crystal calcium sulphate from the phosphoric acid. For effecting a thorough separation a number of such separators must be employed, the crystal residue of one tank or separator being fed into and treated in the next separator, and this process is continued through the series of separators acting counter-current to a flow of weak phosphoric acid which is introduced as water in the last separator and which increases in strength as it flows through the separator system. These tanks comprise very large pieces of apparatus which occupy very substantial plant space, which operate at comparatively low speeds and which, besides being attended with considerable operating troubles, require the use of an excessive amount of power. Moreover, to minimize or prevent the clogging of the tanks and to speed up the settling of the crystals the reaction step of the process requires careful supervision for rather critically controlling the size of the calcium sulphate crystal growth, the crystals when too coarse resulting in the clogging or plugging of the tanks and when too fine resulting in retarding the settling and the separation of the same. The use of the water in this method results furthermore in the said undue dilution of the acid.

My present invention contemplates a complete departure from this and other similar separation methods and centers about the provision of a new and improved method of making phosphoric acid, in which separation is economically accomplished by centrifugal action and in which the reaction step of the process is organized or controlled so as to afford or allow rapid centrifugal separation of the calcium sulphate crystals from the phosphoric acid. I have found that by the use of my improved process, phosphoric acid manufacture may be accomplished, with advantages over prior art methods, by effecting the separation with a centrifuge system which is rapid in its operation, which occupies small plant space and which may be operated at a very low cost to produce phosphoric acid of substantial strength. I have further found that in the practice of my improved method of making phosphoric acid the reaction step does not require the critical supervision incident to prior methods of carefully controlling the crystal growth between upper and lower limits of crystal fineness or coarseness, and that it is only necessary to control the crystal growth to allow the crystals to become large enough to be suitable for being centrifugally removed from the slurry, the larger the crystals the more rapid their separation from the phosphoric acid.

To the accomplishment of the foreging and such other objects as may hereinafter appear, my invention consists in the method and in the steps of the method hereinafter more particularly described and sought to be defined in the claims, reference being had to the accompanying drawing in which:

The figure is a flow sheet of a plant or system embodying a preferred method of practicing the invention.

Referring now more in detail to the drawing, the phosphoric acid manufacture may be considered as being divided into two stages designated respectively as the "reaction stage" and the "separation stage", the reaction stage consisting in effecting the thorough intermixture of ground phosphate rock with sulphuric acid and for controlling the crystal growth of the calcium sulphate and the separation stage consisting in the centrifugal separating of the sulphate and the phosphoric acid by a centrifuge system from which the phosphoric acid and the sulphate are separately removed.

In the reaction stage of the process phosphate rock is raised by an elevator A and fed by means of a screw conveyor B' into a grinding mill C where the phosphate rock is ground with weak phosphoric acid obtained from a storage tank $G_2$ which is pumped by means of a pump H through the piping $p'$ to the grinding mill C. The weak phosphoric acid is preferably employed in the grinding step for the purpose of accelerating the subsequent reaction, the tri-calcium phosphate being largely reduced in the step to a di-calcium phosphate before the sulphuric acid is introduced. The ground slurry leaving the mill C discharges into an agitator $D_1$ where it is mixed with sulphuric acid which discharges into the agitator flowing through the piping $p^2$, the arrows in the drawing indicating the direction of flow of the slurry and the sulphuric acid. The sulphuric acid and the ground phosphate rock are thoroughly agitated in the agitator $D_1$; and to insure complete reaction the slurry flows over from the agitator $D_1$ through the overflow piping $p^3$ into a second agitator $D_2$ where further mechanical mixing takes place.

I have found in the practice of the process that the reaction stage may be desirably controlled so as to produce a difference in the specific gravity between the crystals and the phosphoric acid sufficient to allow the crystals to be centrifugally separated rapidly from the acid. This is accomplished by operating the reaction stage so as to produce crystals large enough for rapid centrifugal separation and so as to produce a phosphoric acid having a specific gravity relatively low enough to allow the crystals to be readily separated from the acid. The speed of agitation of the stirrers in the agitators $D_1$ and $D_2$ and the speed of discharge of the ground rock into the agitator $D_1$ are therefore regulated so as to permit the crystals to become large enough for the purpose, and the flow of the sulphuric acid is regulated so that the strength of the resulting phosphoric acid produced in the reaction stage is less than 30 degrees Baumé. It will be noted that the control of crystal growth is therefore only in one direction, that is to say, the control being such as to prevent too slow a crystal growth, no care being required as in prior processes for preventing too large a crystal growth; and manifestly the larger the crystal growth in the reaction stage of the process of my invention the more rapid the centrifugal separation thereof from the acid.

In the separation stage of the process the slurry or mixture obtained from the agitator system is introduced into a solid basket or solid bowl centrifuge $F_1$ where about 80% of the phosphoric acid contents are removed, the calcium sulphate deposited in the centrifuge $F_1$ being then removed to another agitator $D_3$ where it is mixed with water and delivered to a second centrifuge $F_2$ also of the solid basket or solid bowl type, which functions to separate a weak phosphoric acid from the calcium phosphate, the said weak phosphoric acid being preferably re-employed in the grinding step of the process.

This separation stage may be carried out in the manner shown in the flow sheet of the drawing, the mixture or slurry obtained from the agitator $D_2$ flowing through the piping $p^3$ and discharging into the centrifuge $F_1$. This centrifuge being of the solid basket type, the solids are thrown to the periphery where they pack and are deposited and the liquids stay or remain in the region towards the axis of the centrifuge. The operation of the centrifuge may be carried on continuously until the solids build up to a considerable extent, it being preferable however to operate the centrifuge in a batch or semi-automatic manner. When the centrifuge is charged and the liquid clarified, the power is shut off preferably automatically and the liquor, which consists of a strong phosphoric acid preferably below 30 degrees Baumé, is withdrawn from the centrifuge while the same is rotating on its acquired momentum. The removal of the acid is accomplished by swinging in a pipe $p^4$ which removes the clear liquor or acid and which feeds into the tank $G_1$. Following the removal of the liquor a scraper $E_1$ is introduced into the centrifuge and during the continued rotation of the centrifuge the deposited cake of sulphate is removed and fed by means of a screw conveyor $D_2$ into the agitator $D_3$. In the centrifuge $F_1$ about 75% to 80% of the available phosphoric acid can be removed in each operation, a second centrifuge being therefore provided for removing the remaining phosphoric acid.

The solid deposit introduced into the agitator $D_3$ is thoroughly mixed with water delivered into the agitator through the pipe $p^5$ and the resulting slurry is conveyed by means of the piping $p^6$ into the solid bowl or solid basket centrifuge $F_2$ where an operation similar to that described for the centrifuge $F_1$ is carried out, the weak phosphoric acid obtained being delivered by means of the piping $p^7$ to the weak phosphoric acid tank $G_2$, while the cake deposited in the centrifuge $F_2$ is removed by means of a scraper $E_2$ and a screw conveyor $B_3$. Preferably, as already described, this weak phosphoric acid is utilized in the reaction stage by introducing the same into the grinding mill C.

The manner of practicing the improved process of the present invention and the advantages thereof over prior methods will in the main be fully apparent from the above detailed description thereof. The reaction stage of the process is practiced so as to facilitate the quick or rapid subsequent separation of the crystals from the phosphoric acid, this being accomplished by facile regulation of the steps of the reaction stage. The critical control between upper and lower limits of coarseness and fineness of crystal growth which must be observed in prior methods is unnecessary in this reaction stage of the improved process, it being only required to so govern the reaction stage as to produce crystals of sufficient size for ready centrifugal separation. In the centrifuge separation stage power consumption is exceedingly low and installation and operating costs of the apparatus required are reduced to a low figure. The phosphoric acid obtained in the centrifuge $F_1$ does not suffer the dilution which accompanies other separation methods as, for example, the method employing a system of cascaded Dorr separators. Both centrifuges are of the solid bowl horizontal shaft type and may be operated with considerable ease. The reaction stage is thus combined with the separation stage in a manner to produce phosphoric acid with expedition and at a low installation and upkeep cost, resulting in a very economical system.

It will be further apparent that while I have shown and described my invention in the preferred form, many changes and modifications may be made in the process disclosed without departing from the spirit of my invention, defined in the following claims.

I claim:

1. In the process of making phosphoric acid, the steps of reacting calcium phosphate with sulphuric acid and producing calcium sulphate crystals in phosphoric acid, and in then separating the calcium sulphate crystals from the phosphoric acid by rotating the mixture at high speed for centrifugal action, the crystals being thrown outwardly against an imperforate wall, and the liquid being withdrawn relatively nearer the center of rotation than the crystals.

2. In the process of making phosphoric acid, the steps of reacting ground phosphate rock with sulphuric acid and producing calcium sulphate crystals in phosphoric acid, in so controlling the reaction as to produce a difference in specific gravity between the crystals and the phosphoric acid sufficient to allow the crystals to be rapidly centrifugally separated from the acid, and in then separating the calcium sulphate crystals from the phosphoric acid by rotating the mixture at high speed, the crystals being thrown outwardly against an imperforate wall, and the liquid being withdrawn relatively nearer the center of rotation than the crystals.

3. The process of making phosphoric acid, which consists in grinding phosphate rock in weak phosphoric acid, in reacting the ground phosphate rock with sulphuric acid, in so controlling the reaction as to produce a resultant phosphoric acid having a strength less than 30° Bé., in agitating the slurry produced by the reaction and so controlling the agitation and the reaction as to produce calcium sulphate crystals in phosphoric acid large enough for centrifugal separation from the acid, and in then centrifugally separating the calcium sulphate crystals from the phosphoric acid by rotating the mixture at high speed, the crystals being thrown outwardly against an imperforate wall, and the liquid being withdrawn relatively nearer the center of rotation than the crystals.

4. The method of making phosphoric acid, which includes grinding phosphate rock in weak phosphoric acid, reacting the ground phosphate rock with sulphuric acid to produce calcium sulphate crystals in phosphoric acid, separating the calcium sulphate crystals from the phosphoric acid by rotating the mixture at high speed, the crystals being thrown outwardly against an imperforate wall, and the liquid being withdrawn relatively nearer the center of rotation than the crystals, thereafter removing the deposited calcium sulphate and agitating the same with water to produce a slurry of weak phosphoric acid and calcium sulphate, then centrifugally separating the weak phosphoric acid from the calcium sulphate by rotating the mixture at high speed, the crystals being thrown outwardly against an imperforate wall, and the weak phosphoric acid being withdrawn relatively nearer the center of rotation than the crystals, and finally returning said weak phosphoric acid to the initial grinding stage.

5. In the process of making phosphoric acid, the steps of reacting tricalcium phosphate with sulphuric acid and producing a slurry of calcium sulphate crystals in phosphoric acid, in flowing the slurry into an imperforate centrifuge, in then centrifugally separating the calcium sulphate crystals from the phosphoric acid by first rotating the centrifuge and mixture at high speed, the crystals being thrown outwardly against the imperforate wall of the centrifuge, and by then withdrawing the phosphoric acid during the rotation of the centrifuge at a point relatively nearer the center of rotation than the crystals.

6. The process of making phosphoric acid which consists in grinding phosphate rock in weak phosphoric acid, in reacting the ground phosphate rock with sulphuric acid, in agitating the resulting slurry and controlling the agitation so as to produce calcium sulphate crystals in phosphoric acid, in centrifugally separating the calcium sulphate crystals from the phosphoric acid in a centrifuge, in then withdrawing the acid from the centrifuge, in thereafter withdrawing the deposited calcium sulphate from the centrifuge and agitating the same with water producing weak phosphoric acid and calcium sulphate, and in centrifugally separating the weak phosphoric acid from the calcium sulphate, and returning said weak phosphoric acid to the initial grinding stage.

7. The process of making phosphoric acid which consists in grinding phosphate rock and in reacting the ground phosphate rock with sulphuric acid to produce a slurry, in agitating the resulting slurry and controlling the agitation so as to produce calcium sulphate crystals in phosphoric acid, in centrifugally separating the calcium sulphate crystals from the phosphoric acid in a centrifuge, in then withdrawing the acid from the centrifuge during rotation of the centrifuge, in thereafter withdrawing the deposited calcium sulphate from the centrifuge and agitating the same with water producing weak phosphoric acid and calcium sulphate, and in centrifugally separating the weak phosphoric acid from the calcium sulphate in another centrifuge, and returning said weak phosphoric acid to the initial grinding stage.

Signed at Charlotte, in the county of Mecklenburg and State of North Carolina, this 30 day of Sept., A. D. 1929.

INGENUIN HECHENBLEIKNER.